(No Model.)
R. F. SPANGENBERG.
COTTON PICKER STEM.
No. 364,607. Patented June 7, 1887.
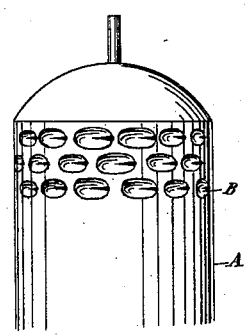
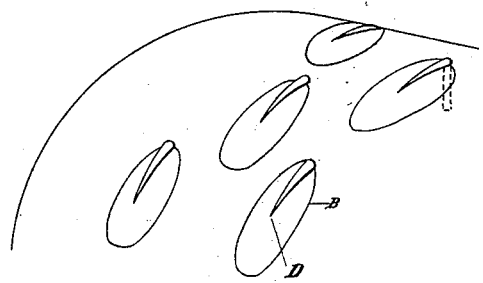
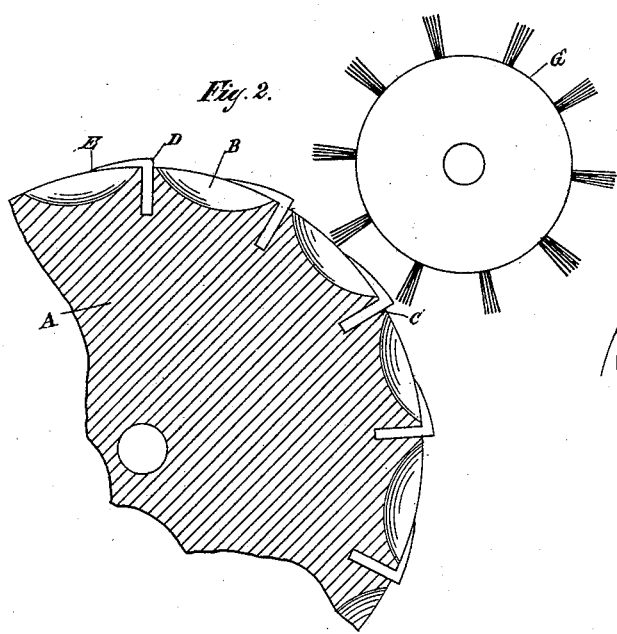
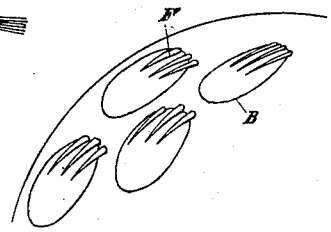
Witnesses
Louis P. Paquet
George J. Genewine
Inventor
Robert F. Spangenberg
by Wm. R. Stringfellow
attorney

United States Patent Office.

ROBERT F. SPANGENBERG, OF NEW ORLEANS, LOUISIANA, ASSIGNOR OF ONE-FOURTH TO EDWARD A. BLAKELY, OF SAME PLACE.

COTTON-PICKER STEM.

SPECIFICATION forming part of Letters Patent No. 364,607, dated June 7, 1887.

Application filed November 11, 1886. Serial No. 218,530. (No model.)

*To all whom it may concern:*

Be it known that I, ROBERT F. SPANGENBERG, a citizen of the United States of America, residing at New Orleans, in the parish of Orleans and State of Louisiana, have invented certain new and useful Improvements in Cotton-Picker Stems, of which the following is a specification, reference being had therein to the accompanying drawings.

My invention relates to improvements in cotton-picker stems, the periphery of the drum or cylinder being provided with a series of indentations, the raised portion between these said indentations provided with openings having therein picking-teeth bent forward over these indentations, so that when the picker-stem is rotated in going forward the said picking-teeth will remove the cotton from the stems, all of which will now be fully set forth, the same being new and useful. I attain these objects by the mechanism illustrated in the accompanying drawings, in which—

Figure 1 is a front view of my cotton-picker stem. Fig. 2 is a sectional view of a portion of the same. Fig. 3 is a perspective view of a portion of the periphery. Fig. 4 is a perspective view of a modification of Fig. 3.

Similar letters refer to similar parts.

A designates a cotton-picker stem, which may be of any suitable length and diameter, and which is circular in cross-section. This stem in practice receives rotary motion by any well-known or suitable machinery. This stem may be made of any suitable material, and it is constructed with rows of oval depressions, $b$, in its surface, which may be produced in the process of casting the stem, if the same be made of cast metal.

D D designate picking-teeth, which are constructed with angular shanks that are driven into the stem A, as shown in Fig. 2. The picking portions of these teeth are concentric to the axis of the stem A, and terminate in sharp points E, about midway of their respective depressions B, the points E being in or nearly in the perimeter of the stem A, as shown in Fig. 2. The points E are formed by beveling the wires from their shanks, so that undue tearing of the cotton-fibers is prevented. In combination with the picker-stem I employ a brush, G, arranged to rotate in the same direction as the picker-stem, but at a greater speed, for freeing the cotton from the teeth D. By reference to Fig. 4 it will be observed that I may employ more than one tooth for each depression B, thus forming a kind of comb; but I do not confine myself to more than one tooth for each depression B.

It will be obvious that I bring the inner surfaces of the teeth in the radius of the surface of the stem A. I thus avoid the liability of tearing the cotton fiber, or "knotting" or "lumping" it. It will also be obvious that the inner angles of the teeth are flush with the periphery of the stem A; hence I avoid liability of tearing the cotton fiber or knotting or lumping it. I am also able to readily remove a broken tooth and substitute a good tooth for it.

I am well aware that it is old in cotton-picking stems having smooth surfaces to insert angular hooks into these surfaces, and I am also aware it is not new to form a picking-stem surface of sheet metal having teeth stamped therein. I therefore disclaim, broadly, such device.

I am also aware that it is not new to compose a picking-stem of annular sections, having depressions in their surfaces, and intermediate saw-blades, the teeth of which overhang said depressions. I therefore disclaim this device.

What I do claim is—

The within-described cotton-picking device, consisting of the solid stem A, having concave depressions in its surface, in combination with the angular independently-removable pointed teeth, the shanks of wihch are inserted into the stem at the edges of said depressions and the pointed portions of which overhang the said depressions, the inner curved sides of said pointed portions being flush with the cylindrical surface of the said stem, substantially as shown and described.

In testimony whereof I affix my signature in presence of two witnesses.

ROBERT F. SPANGENBERG.

Witnesses:
GEORGE J. YENEWINE,
HENRY J. RHODES.